United States Patent
Audigier et al.

(10) Patent No.: US 9,561,630 B2
(45) Date of Patent: Feb. 7, 2017

(54) TREAD INCLUDING AT LEAST ONE WAVY GROOVE, AND METHOD FOR PRODUCING SAME

(75) Inventors: Richard Audigier, Clermont-Ferrand (FR); Stéphane Oraison, Clermont-Ferrand (FR); Christophe Bessac, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 431 days.

(21) Appl. No.: 14/006,248

(22) PCT Filed: Mar. 22, 2012

(86) PCT No.: PCT/EP2012/055142
§ 371 (c)(1),
(2), (4) Date: Nov. 27, 2013

(87) PCT Pub. No.: WO2012/130735
PCT Pub. Date: Oct. 4, 2012

(65) Prior Publication Data
US 2014/0290814 A1 Oct. 2, 2014

(30) Foreign Application Priority Data
Apr. 1, 2011 (FR) ...................... 11 52828

(51) Int. Cl.
*B60C 11/117* (2006.01)
*B29D 30/52* (2006.01)
(Continued)

(52) U.S. Cl.
CPC ........... *B29D 30/52* (2013.01); *B29D 30/0681* (2013.01); *B60C 11/0306* (2013.04); *B60C 11/0323* (2013.04)

(58) Field of Classification Search
CPC .... B60C 11/032; B60C 11/0323; B60C 11/14; B60C 11/18
(Continued)

(56) References Cited

U.S. PATENT DOCUMENTS 2,960,138 A * 11/1960 Chiodo ................... B60C 11/18
152/209.16
5,603,366 A * 2/1997 Nakayama ........... B29D 30/542
152/209.15
(Continued)

FOREIGN PATENT DOCUMENTS

EP 0320215 * 6/1989
FR 2950565 * 4/2011
(Continued)

OTHER PUBLICATIONS

International Search Report (PCT/ISA/210) mailed on Jun. 13, 2012, by the European Patent Office as the International Searching Authority for International Application No. PCT/EP2012/055142.

*Primary Examiner* — Steven D Maki
*Assistant Examiner* — Robert Dye
(74) *Attorney, Agent, or Firm* — Dickinson Wright PLLC

(57) ABSTRACT

Tire for a heavy goods vehicle comprising a tread of total thickness E and total volume V, having a tread surface intended to come into contact with a roadway, at least one cavity or groove that is continuous in a main direction, and delimited by side walls connected by a bottom, a cross section, the points furthest towards the inside of the bottom of each cavity defining a bottom line, wherein each cavity or groove comprises a plurality of open sections open onto the tread surface in the new state and a plurality of closed sections, connected to the open sections being arranged in alternation, each closed section being spaced away from the tread surface by a bridge of rubber, wherein the points on the bottom line of said cavity or groove lie at distances between
(Continued)

a minimum distance Dm and a maximum distance DM with respect to the tread surface, the bottom line of each cavity or groove following a wavy geometry of positive amplitude equal to the difference (DM−Dm).

7 Claims, 3 Drawing Sheets

(51) Int. Cl.
  *B60C 11/03* (2006.01)
  *B29D 30/06* (2006.01)
(58) Field of Classification Search
  USPC .................................................. 152/209.17
  See application file for complete search history.

(56) References Cited

U.S. PATENT DOCUMENTS

| | | | |
|---|---|---|---|
| 7,208,110 B2* | 4/2007 | Lopez | ............... B29D 30/66 152/209.17 |
| 7,249,620 B2* | 7/2007 | Croissant | ............ B60C 11/0302 152/154.2 |
| 8,875,758 B2* | 11/2014 | Cress | ................. B29D 30/0606 152/209.17 |
| 2003/0201048 A1 | 10/2003 | Radulescu et al. | |
| 2005/0081972 A1 | 4/2005 | Lopez | |
| 2006/0088618 A1 | 4/2006 | Radulescu et al. | |
| 2008/0128062 A1 | 6/2008 | Lopez | |
| 2012/0227883 A1* | 9/2012 | Audigier | ............. B60C 11/0309 152/209.18 |

FOREIGN PATENT DOCUMENTS

| | | | |
|---|---|---|---|
| GB | 751641 | * | 7/1956 |
| JP | 2006-182126 | * | 7/2006 |
| WO | WO 02/38399 A2 | | 5/2002 |
| WO | WO 03/097384 A1 | | 11/2003 |

* cited by examiner

Coupe II-II

Coupe III-III

TREAD INCLUDING AT LEAST ONE WAVY GROOVE, AND METHOD FOR PRODUCING SAME

BACKGROUND

1. Field

The present invention relates to treads for tires fitted to heavy goods vehicles and more particularly relates to the tread patterns of these treads.

2. Description of Related Art

Driving in the rain requires the water in the region of contact between each tire and the roadway to be removed as swiftly as possible in order to ensure contact between the material of which the tread is made and this roadway. To achieve this, grooves are formed on the tread, which grooves, on account of their dimensions (depth and width) remain open in the contact patch for contact with the roadway and thus allow water which is not pushed forward and around the sides of the tire to flow away.

The grooves may have any shape when viewed in cross section and in terms of the lines that they follow along the tread surface and may be oriented in any direction. What is meant by the line followed by a groove along the tread surface is the mean geometric line followed by the corner edges that the said groove forms on the said surface.

In the case of the tires intended for the steered or load-bearing axles of a heavy goods vehicle, it is common practice for the tread of these tires to be provided with longitudinal grooves the depth of which is equal to or substantially equal to the total thickness of the tread (not including any thickness of tread which may have been provided with a view to allowing the grooves to be partially renewed through a regrooving operation). As a general rule, this depth is between 13 and 18 mm on these axles. For the tires intended for the driven axles, the groove depth is greater and may be as much as 24 mm. The "total thickness of a tread" here means the total thickness of material that can be worn away before a tire has to be changed or reconditioned by retreading.

In the case of such tires of the prior art, the total void ratio is, as a general rule, between 15 and 25% of the volume of tread intended to be worn away during driving. It is found that these tires have an available void volume in the contact patch which is relatively high in the new state; this void volume opening onto the tread surface in the contact patch is, on average, of the order of 100 $cm^3$ for example for a tire of size 315/70 R 22.5. For the tire in question, this value is obtained for its nominal inflation pressure and static loading conditions as set down in particular in the ETRTO standard.

Moreover, in order to improve the grip between the tire and the roadway it is known practice to form edge corners of rubber on the tread surface. To form such edge corners, sipes are made, these being thin incisions of an average width that is such that, under normal loading conditions, the walls of material delimiting each sipe can, at least partially, come into contact with one another as they pass through the contact patch in which the tire makes contact with the road surface so as to limit the loss of rigidity associated with the presence of the sipes. These sipes may be of a depth equal to the thickness of the tread to be worn away or less than this thickness.

While grooves, or more generally, cavities, are essential to draining water away, the resulting reduction in surface area of material may have an appreciable effect on the wear rate performance of a tread and therefore reduce the service life of the tire as the result of an increase in the wear rate. Other tire performance aspects may also be affected, notably its behavior, road noise and rolling resistance. It is also found that these grooves which are formed to have a working depth equal to the height of tread to be worn away may be the cause of endurance problems. Under certain driving conditions, foreign objects such as stones may become lodged in these grooves and attack the bottoms of these grooves and cause breakages to appear in the rubber. It has also been observed that manoeuvres involving mounting and descending from various obstacles can cause breakages at the bottoms of certain grooves, notably those situated near the lateral edges of the tread.

It is known that the presence of grooves in a tread generates a reduction in the compression and shear stiffness of this tread because these grooves delimit portions of material which deform more readily by comparison with the portions delimited by sipes the walls of which can come into contact with one another. This reduction in stiffness, in the case of the presence of grooves, leads to an increase in deformation and generates a reduction in the wear performance of the tread: greater wear for a set distance covered is observed (which corresponds to an increase in the tread wear rate). Moreover, an increase in the rolling resistance and therefore in the fuel consumption of vehicles equipped with such tires is noted, this being the result of an increase in hysteresis losses which are associated with the deformation cycles of the material of which the tread is made.

Bearing in mind the thickness that their tread needs to have, the usual tires used on heavy goods vehicles have, in the region of the edges of the tread, operating temperatures which govern the choice of rubber materials used in the tread and notably require the use of compositions the hysteresis of which is limited.

Document WO 03/097384 A1 discloses a tire for a heavy goods vehicle having a tread comprising grooves that are open to the tread surface and underlying cavities beneath the tread surface in the new state, each of these cavities having a top generatrix that follows a wavy profile.

DEFINITIONS

The tread pattern of a tread means, in this description, the geometry of that part of the tread that is intended to come into contact with a roadway, this tread pattern being formed of raised elements delimited from one another by cutouts (grooves, sipes, wells, cavities).

The total volume of a tread is equal to the total volume of material that can be worn away during driving before the tire has to be removed in order either to renew its tread by retreading, or be replaced with a new tire.

The total void (or cavities) volume of a tread is equal to the sum of all the void volumes that open or do not open onto the tread surface in the new state. A void means grooves, wells or any type of cavity, the said cavities being intended to open into the contact patch for contact with the roadway and contribute at one time or another to drainage in the contact patch.

A block is a raised element formed on the tread and which is delimited by voids or grooves and has side walls and a contact face intended to come into contact with the roadway during driving.

The equatorial median plane is a plane perpendicular to the axis of rotation of the tire and which passes through all the points on the tire that are radially furthest from the said axis of rotation. This equatorial plane divides the tire more or less into two more or less equal halves.

A radial direction means a direction perpendicular to the axis of rotation of the tire (this direction corresponds to the direction of the thickness of the tread).

An axial direction means a direction parallel to the axis of rotation of the tire.

A circumferential direction means a direction perpendicular both to the axial direction and to a radial direction.

As usual, the present text uses the terms "elastomer" and "rubber" indiscriminately, these two terms being interchangeable.

SUMMARY

Disclosed herein is a tread for a tire intended to be fitted to a heavy goods vehicle and which, by the use of a type of tread pattern, allows a significant and simultaneous improvement in this tread of: the wear performance, the rolling resistance performance, the wet roadway grip performance, the resistance to mechanical attack notably to the bottoms of the grooves near the lateral edges.

To this end, one embodiment disclosed herein is a tire for a heavy goods vehicle comprising a tread of total thickness E and total volume V, this tread having a tread surface intended to come into contact with a roadway, and further having:

at least one cavity or groove that is continuous in a main direction, this cavity or groove being delimited by side walls connected by a bottom, this cavity or groove having a cross section, the points furthest towards the inside of the bottom of each cavity defining a bottom line, each cavity or groove comprises a plurality of open sections open onto the tread surface in the new state and a plurality of closed sections, the closed sections connected to the open sections being arranged in alternation, (which means that an open section is flanked by two closed sections), each closed section being spaced away from the tread surface by a bridge of rubber, this tread being characterized in that:

the points on the bottom line of the said cavity or groove lie at distances between a minimum distance Dm and a maximum distance DM, these distances, which are measured on the tread in the new state with respect to the tread surface, being at most equal to the thickness E of the tread, the bottom line of each cavity or groove follows a wavy geometry of positive amplitude equal to the difference (DM−Dm) and along a wavelength less than the mean length of the contact patch measured under the conditions of use as laid down in the E.T.R.T.O. standard for the tire, the bridge of rubber formed between each closed section and the tread surface is continuous.

For preference, the minimum distance Dm between the bottom line of the wavy grooves and the tread surface is at least equal to 25% of the thickness E of the tread.

The term "wavy" can be interpreted in the present description as meaning zigzagging or even oscillating between two levels, a minimum distance (at a distance Dm from the tread surface) and a maximum level (at a distance DM from the same tread surface).

The E.T.R.T.O. service conditions specify the reference inflation pressure corresponding to the load bearing capability of the tire as indicated by its load rating and its speed code. The contact patch for contact with the roadway is determined with the tire statically, and from this an average contact patch length is calculated.

The expression "lie at distances between a minimum distance Dm and a maximum distance DM" should be understood here to indicate that points on the bottom of one cavity lie at a distance equal to the minimum distance Dm and other points on the same bottom lie at a distance equal to the maximum distance DM, other points on the same bottom lying at distances greater than the minimum distance Dm and other points at distances less than the maximum distance DM with respect to the tread surface.

The expression "wavy geometry of an amplitude equal to the difference (DM−Dm) and the mean wavelength of which is shorter than the mean length of the contact patch measured under the service conditions as laid down by the E.T.R.T.O. standard for the tire" is to be interpreted as meaning that the cavity is formed of a plurality of cavity sections, some of the sections, referred to as "open", being—at least when the tread is new, open to the tread surface whereas other sections, referred to as "closed" lie wholly beneath the tread surface when the tread is new and therefore unworn. The open and closed sections are arranged in alternation. The closed sections are intended to open onto the tread surface only when the tread is part worn. Thus, a kind of groove is formed the wavy geometry of which means that in places this groove opens onto the tread surface when the tread is new and that, between these open places, the said groove forms a channel in the tread (which is equivalent to saying that this continuous cavity is open discontinuously onto the tread surface).

Each continuous and wavy cavity or groove in the thickness of the tread has a mean cross section, it being possible for the surface area of this cross section to be constant or to vary about a mean value so as to allow fluid to flow along the said groove.

Thanks to a tread according to the description herein, a continuous bridge of rubber is created, this extending radially on top of each closed section of each wavy groove, this being a particularly effective way to increase the resistance to deformation resulting from knocks to the lateral edges of the tread or resulting from driving over obstacles at least when the tread is new. A continuous bridge of rubber is to be understood as meaning that the material situated radially on the outside of each closed section is devoid of any sipe or groove running in the same direction as the main orientation of the cavity.

A cavity according to the embodiments disclosed herein may be formed in a main direction which is the circumferential direction of the tire, and in this case, the said cavity extends all around the tire or alternatively in an oblique or even transverse direction. Of course, a combination of various orientations on the same tread is possible, just as it is possible to provide for cavities to be formed at varying depths in the tread.

Also disclosed herein is a method of obtaining a tread for a tire, this tread comprising at least one continuous wavy cavity or groove, this method comprising the following steps:

preparing an unvulcanized band of rubber,
incorporating into this band of rubber at least one insert with a geometry which is wavy
molding and vulcanizing the tread band,
at least partially removing each insert to form at least one continuous wavy cavity or groove.

For preference, the bottom line of the cavity comprising an insert follows a wavy geometry having a wavelength less than the mean length of the contact patch measured under the conditions of use as laid down by the E.T.R.T.O. standard for the new tire.

One way of creating such a tread is to incorporate an insert into an unvulcanized band, this insert corresponding to the dimensional characteristics of the wavy continuous cavity that is to be obtained. The insert is positioned in the unvulcanized band in a geometry which is wavy from the external surface of the tread in the new state or, at the very least, the vicinity of this external surface. This operation can be carried out by a co-extrusion operation using an extruder that has a main extrusion head in the interior of which there is at least one secondary head for extruding the insert, the latter head being provided with means for moving it in the desired direction of waviness of the cavity.

This co-extrusion operation can be carried out using a machine for creating a vehicle tire tread like the one described in a patent application filed in 2010 but not yet published at the date of filing of this present application.

According to this previous patent application, the machine comprises:
means for extruding an unvulcanized band of rubber;
means for forming at least one furrow in this tread with a geometry that is wavy at least in the depth of the tread;
means for accepting a reel of strip to form the insert; and
means for inserting a strip from the reel into the furrow or into each furrow.

Of course, this insert needs to be made from a material that can be removed from the tread after vulcanizing so as to reveal a continuous and wavy cavity. It is thus possible to use a material with tensile strength that can then be removed by pulling it out after curing and before the tire is used.

Another means is to use, for forming the insert, a material which is able to be eliminated by dissolving it on contact with water as soon as it becomes at least partially visible at the tread surface. After molding and vulcanizing, water can be introduced into the vicinity of each insert until the said insert is completely dissolved. This may happen following part wear that brings the insert into contact with the tread surface.

Another possibility is to form the insert from a powder material which, through its lack of cohesion, can be eliminated simply under the effect of centrifugal forces as soon as the tire begins to turn.

Another possibility is to use a material that cannot be vulcanized (a saturated material containing no double bonds) which can be removed after molding to form a continuous groove.

The insert used to form a wavy groove may advantageously be cut beforehand to lengths shorter than the total length of the tread. This measure then makes subsequent extraction of the insert from the tread after molding easier.

Of course, a combination of these various means can be employed depending on the section of the cavity, the amplitude of its waviness and its mean wavelength. Once molded and vulcanized, the tread may, if necessary—namely if the insert or inserts are not visible at the tread surface—be machined slightly to reveal the open sections of the cavity on the tread surface. To make the insert more clearly visible, it is possible to plan for it to be colored in a color that differs from that of the tread.

In another likewise advantageous variant, an insert in the form of a hollow tube may be introduced into a tread which tube after molding and vulcanizing delimits a continuous cavity in its interior. This hollow tube can be made of a rubbery material based on at least one elastomer, it being possible for this rubbery material either to be the same as or not the same as that of the tread itself, this material moreover being designed to remain in place following part wear that reveals the insert. In order to mold a cavity, it may be sensible to provide a means for maintaining pressure inside the tube during molding (either by filling it with a liquid that can be removed after molding or by filling it with a pressurized gas).

In another embodiment, this tube may be made from a material that differs from that of the tread. For example, this material may have an increased resistance to tearing by comparison with the same performance of the material of which the tread is made. Plastics materials may be used for this.

For preference, the total voids volume is at least equal to 7% and at most equal to 12% of a volume equal to the sum of the total volume V of the tread and the total volume of voids.

For preference, this tread has an effective voids volume Ve for each wearing layer, this effective voids volume contributing to draining the contact patch in which the tread makes contact with a roadway and satisfying the following equation:

$$0.4 Se < Ve < 0.8 Se$$

in which 0.4 and 0.8 are heights expressed in millimeters (mm) and Se is the surface area (in $mm^2$) delimited by the external contour of the contact patch in which the tread is in contact with a ground as measured under static conditions under the service (pressure and load) conditions as laid down in the E.T.R.T.O. standard for the tire concerned.

The effective voids volume Ve for each wearing layer here means a voids volume formed in the tread to serve to drain the contact patch of the tread, this effective voids volume being determined when the tire is subjected to usual service conditions.

A wearing layer in the present application means part of the tread connected with the maximum depth of the grooves in the said wearing layer. A wearing layer has a thickness which is less than the total thickness of the tread and which is equal to the maximum depth of the grooves or cavities present in this wearing layer. The treads of the invention comprise at least two wearing layers some of the grooves or cavities of which are formed in just one of the said layers. It is of course possible and even advantageous that, in this configuration, each wearing layer should become active before a previous wearing layer has been completely worn away; in such an instance, there is an overlap between at least two wearing layers. One wearing layer becomes active once the cavities or grooves formed in this layer open onto the tread surface of the tire in contact with the roadway to drain away the water present on said roadway in wet weather. The first wearing layer corresponds to the part of the tread that is radially outermost in the new state.

The heights of 0.4 mm and 0.8 mm correspond to mean heights of water that may be present on a roadway in wet weather and that have to be drained away or picked up to maintain good contact between the tread and the roadway. These mean heights, multiplied by the surface area Se—the surface area determined by the contour of the contact patch of the tread on the same roadway and expressed in $mm^2$ (the surface areas corresponding to the cavities that open onto the tread surface are taken into consideration here)—are able to give an indication of the effective void volume Ve when the tire is subjected to nominal service conditions (internal inflation pressure and load carried). If this volume Ve is less than 0.4 times Se, then it is not enough to provide sufficient drainage and water will remain at the interface between the tire and the roadway. If this volume Ve is greater than 0.8 times Se then this volume is deemed to be excessive from the viewpoint of obtaining suitable tread stiffness.

According to a preferred variant of the present invention, the tread comprises at least one groove that is continuous and wavy in the circumferential direction and comprises a plurality of open sections open onto the tread surface in the new state and a plurality of closed sections situated radially and entirely on the inside of the tread in the new state, so as to form a kind of first wearing layer down to the radially innermost points of the open sections. After this first wearing layer, other wearing layers extend into the depth of the tread as far as the innermost points of the internal cavities of the wearing layer considered, the open sections having a mean depth at most equal to 75% of the thickness of the tread, the closed sections having a mean height at most equal to 75% of the thickness of the tread.

According to a preferred variant, the minimum distance Dm of the bottom line of a wavy groove is at least equal to 25% of the thickness of the tread.

According to another preferred variant of the invention, each wavy groove has a cross section of constant or substantially constant surface area (which means to say one in which the variations represent 10% at most).

According to another advantageous variant of the tire of the invention, all the wearing layers of the tread have the same composition.

Other features and advantages of the invention will become apparent from the description given hereinafter with reference to the attached drawings which, by way of non-limiting example, show one embodiment of the subject matter of the invention.

DETAILED DESCRIPTION OF SPECIFIC EMBODIMENTS

FIGS. 1 to 5 show the steps involved in producing a tread according to the invention.

Figure 1:
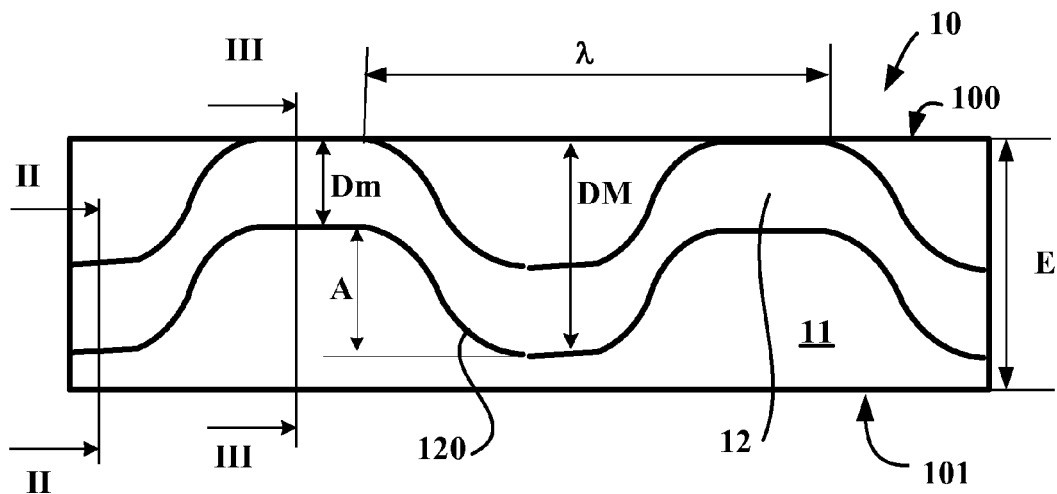
FIGS. 1 to 5 show the steps in producing a tread according to the invention.

FIG. 1 shows a lateral surface 11 of an unvulcanized band of rubber 10 that has an external surface 100 intended to become part of a surface of a tread after vulcanizing and molding and an internal surface 101 intended to be placed on a green tire. This band of rubber has—measured between the external 100 and internal 101 surfaces, a height E corresponding to the thickness of the tread. Formed on the lateral surface 11 of this band of rubber 10 is a groove 12 following a wavy line in the height E of the tread.

Figure 4:
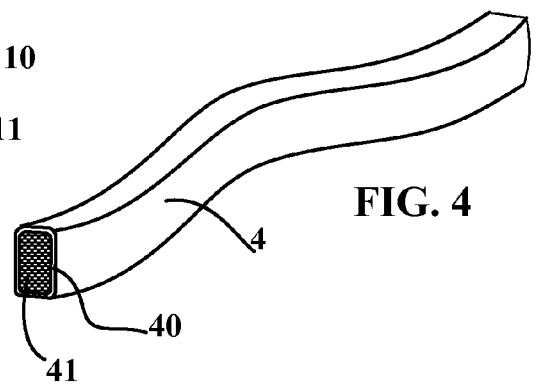

This groove 12 is appropriately sized to accept an insert 4 like the one shown in example in FIG. 4. This groove 12 has a wavy shape and is continuous in the main direction of the band of rubber. This groove 12 comprises a bottom line 120 (line connecting the points on the bottom which are furthest towards the inside) which undulates between a minimum distance Dm and a maximum distance DM, these two distances being measured in relation to the external surface 100. The groove 12 is illustrated as flush with the external surface 100 but could be situated with a non-zero offset distance in relation to this external surface 100 in order to form a cavity filled with an insert.

This groove 12 has an amplitude A equal to the difference DM-Dm, which is less than the thickness E of the tread whereas the wavelength λ of the undulating waviness of this groove is chosen to be less than the mean length of contact patch of a tire for which a tread is produced using this band of rubber.

Figure 2:
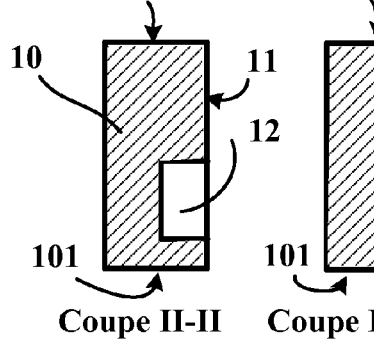
Figure 3:
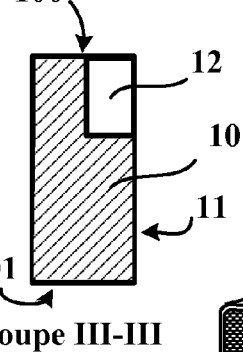

FIGS. 2 and 3 show cross sections through the band of rubber 10 in planes of section identified by the lines II-II and III-III respectively in FIG. 1.

FIG. 4 shows an insert 4 intended to be placed in the wavy groove 12. This insert 4 is formed of a rubber skin 40 enveloping a core 41 made of a powder material.

Figure 5:
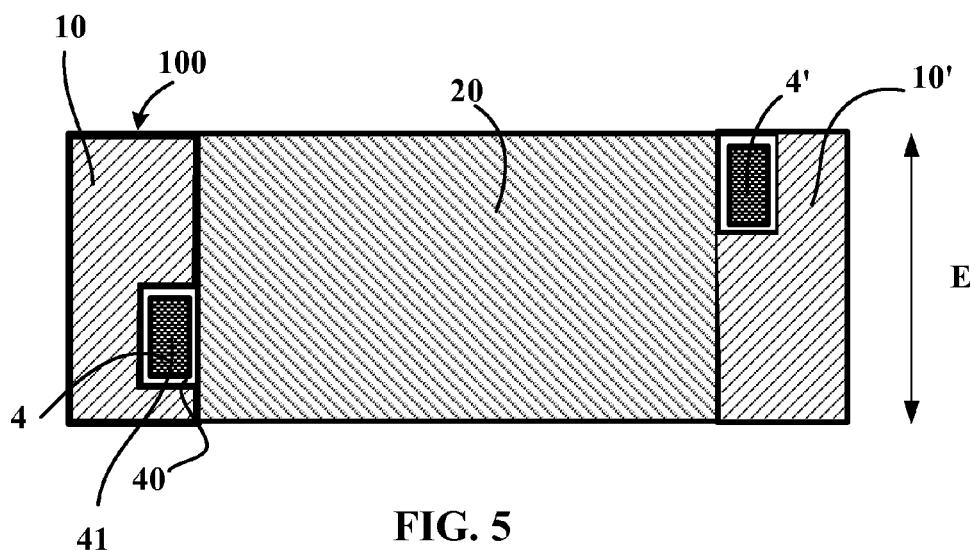

FIG. 5 shows the assembly of three bands of rubber: a first band of rubber 10 provided with an insert 4, a second band of rubber 20 without an insert and a third band of rubber 10' provided with an insert 4'. This third band of rubber 10' is formed in a similar way to the band of rubber 10, the groove formed on this band of rubber 10' being offset in the longitudinal direction (which corresponds to a direction perpendicular to the plane of the figure) in relation to the groove formed on the first band of rubber 10.

Figure 6:
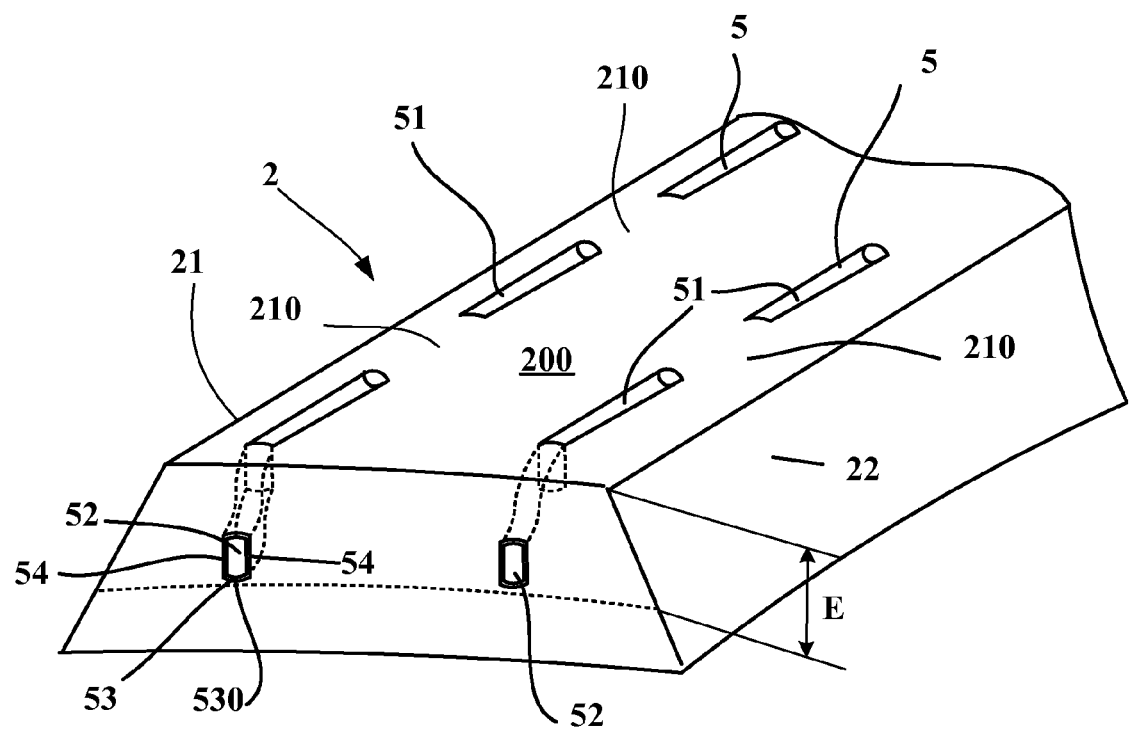
FIG. 6 shows a tread after molding and removal of the insert that moulds a wavy groove according to the invention.

FIG. 6 shows a tread 2 after molding and removal of the inserts each molding a wavy groove 5 according to the invention. After the stack of bands of rubber as shown in FIG. 5 has been vulcanized and molded, it is easy to slightly machine the external surface intended to become the tread surface 200 of the tread 2 in order to reveal the inserts and thus allow them to be removed in order to form the continuous wavy grooves 5. These wavy grooves 5 formed near the lateral edges 21, 22 of the tread are formed of a succession of open sections 51 which are open onto the tread surface and joined together by closed sections 52 passing through the thickness of the tread. Between the tread surface 200 and these closed sections 52, the presence of bridges of rubber 210 ensures excellent mechanical resistance to knocks and loading applied to the lateral edges of the tread. In this example, it may be seen that the skin 40 of each insert 4 (as shown in FIG. 4) is held in place in the groove and, through using an appropriate material, allows the resistance to potential cracking to be improved still further. This skin forms the lateral walls 54 and the bottom 53 of the wavy grooves 5.

In this particular instance, the lengths of the open sections 51 are greater than the lengths of the closed sections 52 and the cross sections are substantially the same for each of the open and closed sections so as to ensure optimal circulation of fluids and particularly liquids in the new state.

There is thus obtained a tire for a heavy goods vehicle comprising a tread 2 of total thickness E and total volume V, this tread having a tread surface 200 intended to come into contact with a roadway, this tread having:

at least one cavity or groove 5 that is continuous in a main direction, this cavity or groove 5 being delimited by side walls 54 connected by a bottom 53, this cavity or groove having a cross section, the points furthest towards the inside of the bottom 53 of each cavity defining a bottom line 530, each cavity or groove comprises a plurality of open sections 51 open onto the tread surface in the new state and a plurality of closed sections 52, the closed sections connected to the open sections being arranged in alternation, each closed section being spaced away from the tread surface by a bridge of rubber, this tread being such that:

the points on the bottom line 530 of the said cavity or groove lie at distances between a minimum distance Dm and a maximum distance DM, these distances, which are measured on the tread in the new state with respect to the tread surface, being at most equal to the thickness E of the tread, the bottom line 530 of each cavity or groove follows a wavy geometry of positive amplitude equal to the difference (DM-Dm) and along a wavelength less than the mean length of the contact patch measured under the conditions of use as set forth in the E.T.R.T.O. standard for the tire, the bridge of rubber 210 formed between each closed section 52 and the tread surface 200 is continuous i.e. has no cut connecting the tread to the closed section.

Figure 7:
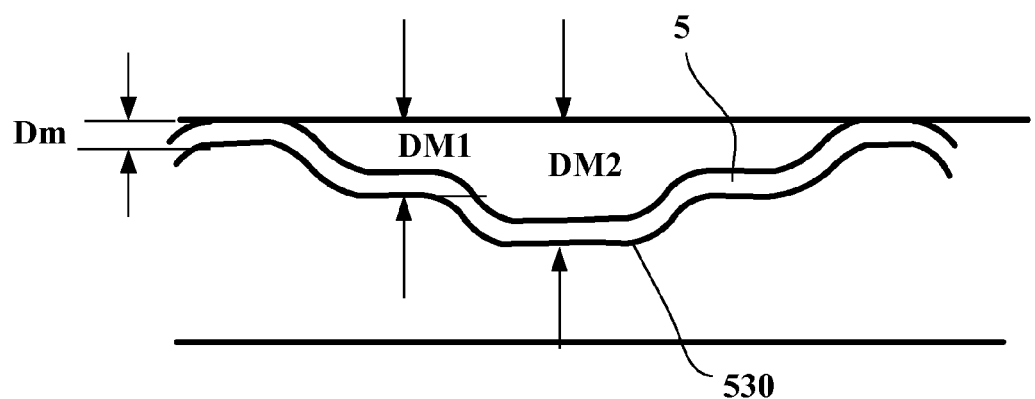
FIG. 7 shows a variant of wavy groove according to the invention.

FIG. 7 shows a variant of wavy groove 5 according to the invention. According to this variant, the wavy groove 5 has several successive levels, the bottom line 530 undulating between a position lying a distance Dm from the tread surface, a first position lying a distance DM1 away and a second position lying a distance DM2 away, the latter distance being greater than the distance DM1. The total amplitude A of the groove in this case is equal to the difference DM2–Dm. The wavelength λ of this waviness— equal to the distance between two consecutive open sections on the tread surface, is chosen to be shorter than the mean length of the contact patch in which the tire is in contact with a roadway when being driven under normal service conditions so as to have, at least in part, two open sections for each wavy groove in the contact patch in contact with a roadway. Each level defines one wearing layer of the tread.

Figure 8:
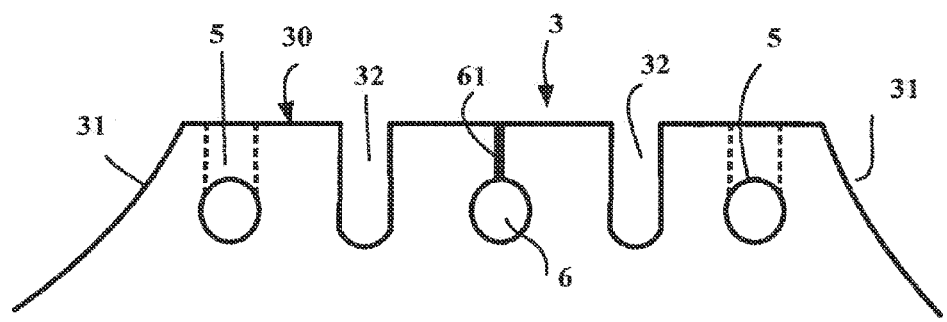
FIG. 8 shows a variant of tire tread according to the invention.

FIG. 8 shows a variant of a tread 3 of a tire according to the invention, this tread having been obtained using the method just described in conjunction with FIGS. 1 to 5. The tread 3, which is shown in cross section (namely in section in a plane of section that contains the axis of rotation of the tire) comprises a tread surface 30 intended to come into contact with a roadway during driving, this tread surface being transversely bounded by sidewalls 31. This tread 3 comprises two grooves 32 of a depth equal to the thickness of the tread, these two grooves 32 flanking a sipe 61 extended by a channel 6 intended to form a new groove following part wear substantially representing half the thickness of the tread. The channel 6 extends at a maximum depth equal to that of the grooves 32.

Furthermore, axially towards the outside of each groove 32, the tread comprises a continuous wavy groove 5 in the circumferential (or longitudinal) direction. Each wavy groove comprising a plurality of open sections open to the tread surface and of closed sections similar to those described in connection with FIGS. 1 to 5. Thus it is possible to strengthen the lateral edge parts of the tread while enjoying the beneficial effect of drainage grooves. Following part wear, these wavy grooves 5 form cavities not connected to one another and the opening of the channel 6 to the tread surface allows some of the drainage potential of the tread to be restored.

Figure 9:
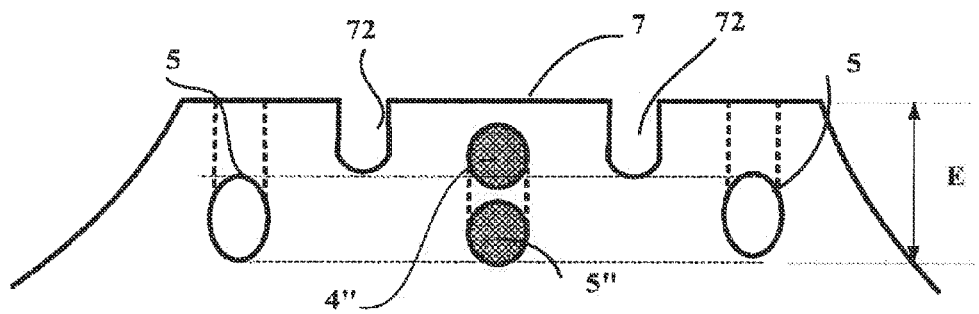
FIG. 9 shows a variant of tire tread according to the invention.

FIG. 9 shows a variant of a tread 7 of a tire according to the invention which is fairly similar to the variant shown in FIG. 8. In this particular instance, grooves 72 are formed that have a depth less than the thickness of the tread (which means to say less than the thickness that can be worn away before the tread reaches the legal wear limit).

On the edges, which means axially on the outside of each groove 72, is formed a wavy and continuous groove 5 comprising a plurality of open sections open to the tread surface of the tread in the new state. The maximum depth of these wavy grooves (DM) is equal to the thickness of the tread.

In the central part of this tread 7 is formed a continuous cavity 5" which is wavy in the depth of the tread and filled at the time of manufacture with an insert 4". This insert is intended to be eliminated to form a new and continuous wavy groove when tread wear reaches the said insert (in an embodiment variant, the insert may be a tube filled with a powder material which is eliminated as the tire rotates). For preference, this insert becomes visible before the open sections of the continuous and wavy grooves 5 formed on the edge parts of the tread have been completely worn away.

All the examples described use a single rubber compound, but it must be appreciated here that the composition may be adapted to suit each wear level. Likewise, the treads shown in a simplified manner may also comprise transverse grooves, it being possible for these same transverse grooves to be of a depth equal to the thickness of the tread or alternatively of wavy appearance just like grooves that are wavy and oriented in the circumferential direction.

Of course, the invention is not restricted to the examples described and depicted and various modifications can be made thereto without departing from the scope defined by the claims. In particular, although the whole of the present description is dedicated to describing the application to a tire intended to be fitted to a heavy goods vehicle, it must be understood that a tread comprising a tread pattern and a composition which are such as defined here also forms part of the invention because such a tread is intended to be incorporated into a tire (either at the time of manufacture or during the retreading of the said tire). Moreover, the creation of a wavy cavity in the thickness of the tread may be accompanied by waviness in a direction in the direction of the width of this same tread.

The examples described show two wearing layers; of course a higher number of wearing layers may be provided, it being possible for one and the same groove to pass through these wearing layers.

Figure 10:
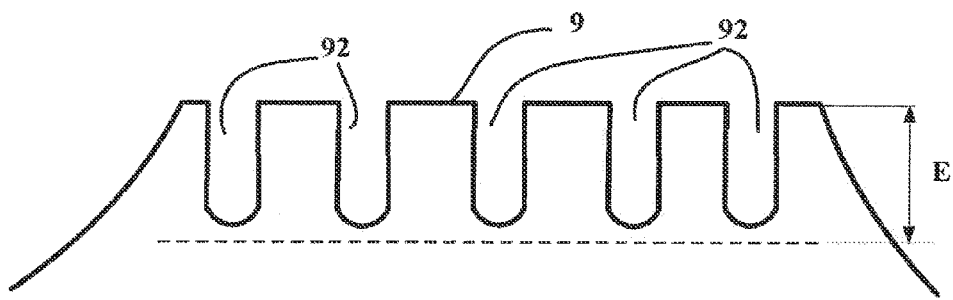
FIG. 10 shows a tread pattern according to the prior art.

FIG. 10 shows a plan view of a tread 9 according to the prior art corresponding to a tire of size 315/70 R 22.5. The service conditions as defined by the E.T.R.T.O. standard for this size of tire when mounted as a single wheel are: inflation pressure 9.00 BAR, load per tire 3750 kg.

For the tire in question, this tread 9 comprises five longitudinal grooves 92 of which the depth, equal to the thickness E of the tread, is 15 mm, this thickness corresponding to the thickness of material intended to be worn away during driving. This tread further comprises transversely oriented grooves.

In the initial state corresponding to the tread being new and unworn, the tread has a total void volume measured under the indicated inflation-pressure and load conditions, available in the contact patch for contact with a roadway which is high and equal in this particular instance to 100 $cm^3$. This volume is measured under the service conditions as defined above under static conditions.

In this particular instance, there is only one wearing layer because the total void volume formed by the longitudinal grooves is open in its entirety to the tread surface in the initial state (new tire) and this void volume decreases as the tread gradually wears away.

This tread has a total void volume equal to 19% of the total volume of tread designed to be worn away.

All the grooves have depths equal to the thickness of the tread.

The effective void volume Ve of this tread is greater than the volume obtained by multiplying a height equal to 1 mm by the surface area St (in mm$^2$) corresponding to the surface area delimited by the external contour of the contact patch of the tread measured under static conditions and under nominal pressure and load conditions.

For this tread, the effective void volume Ve for draining away water in the contact patch for contact with a roadway in the single wearing layer is equal to 100% of the total void volume Vt of the tread because all the voids open onto the tread surface of the new tire.

It is noticed that this traditional structure of the tread patterns necessary for obtaining satisfactory drainage in the new state and until the tread reaches the wear limit imposes a void volume ratio which, in the initial state (when the tread is new) is very high and results in a drop in the (compressive and shear) stiffnesses that can be compensated for only partially and only through the use of suitable materials.

Thanks to the invention described here and notably thanks to the presence of a larger volume of material for the same thickness allows the treads to be made stiffer thus achieving better resistance notably to knocks against the lateral edges of these treads.

The invention claimed is:

1. A tire for a heavy goods vehicle comprising:
    a tread of total thickness E and total volume V, comprising:
        a tread surface intended to come into contact with a roadway;
        at least one cavity or groove that is continuous in a main direction, with the at least one cavity or groove being delimited by side walls connected by a bottom, this cavity or groove having a cross section, the points furthest towards the inside of the bottom of each cavity or groove defining a bottom line;
    each cavity or groove comprising:
        a plurality of open sections that open onto the tread surface in the new state, and
        a plurality of closed sections connected to the open sections and arranged in alternation, such that each closed section is spaced away from the tread surface by a bridge of rubber,
        a bottom line of the at least one cavity or groove containing points that lie at distances between a minimum distance Dm and a maximum distance DM, these distances, which are measured on the tread in the new state with respect to the tread surface, being at most equal to the thickness E of the tread;
    at least one insert to form a cavity that is continuous in a main direction, the formed cavity being delimited by side walls connected by a bottom, the points furthest towards the inside of the bottom of the formed cavity defining a bottom line of wavy shape, the at least one insert being arranged in the tread in such a way as to appear on the tread surface only when the tread is partially worn;
        wherein the bottom line of each cavity or groove follows a wavy geometry having a positive amplitude equal to the difference (DM−Dm) and having a wavelength less than a mean length of the contact patch measured under the conditions of use as set forth in the E.T.R.T.O. standard for the new tire,
        and wherein the bridge of rubber formed between each closed section and the tread surface is continuous.

2. The tire according to claim 1, wherein the minimum distance Dm between the bottom line of the formed cavity with a wavy shape and the tread surface is at least equal to 25% of the thickness E of the tread.

3. The tire according to claim 1, wherein the bottom line of the formed cavity with a wavy shape further comprises an insert that follows a wavy geometry having a wavelength less than the mean length of the contact patch measured under the conditions of use as set forth in the E.T.R.T.O. standard for the new tire.

4. The tire according to claim 1, wherein the formed cavity with a wavy shape is delimited by walls formed in a material which is different from the material of which the tread is made.

5. The tire according to claim 1, wherein each insert is surrounded by a material that is different from the material of which the tread is made, this material being adapted to remain connected to the tread after the insert has been eliminated.

6. The tire according to claim 1, wherein each insert takes the form of a hollow tube.

7. The tire according to claim 6, wherein each hollow tube is formed from an elastomeric material, each of the tubes being provided to maintain pressure inside the said tube during molding.

* * * * *